Feb. 3, 1931.  F. G. ALBORN  1,790,737
WHEEL AND PULLEY ATTACHING CONSTRUCTION
Filed Aug. 28, 1926
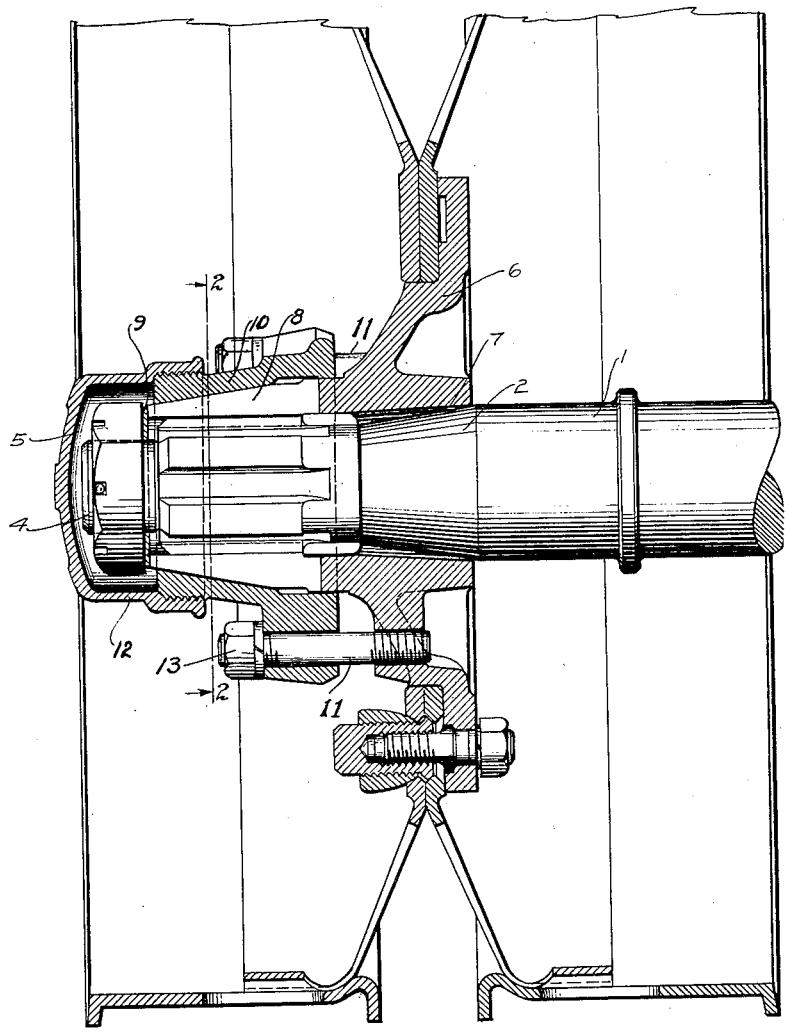
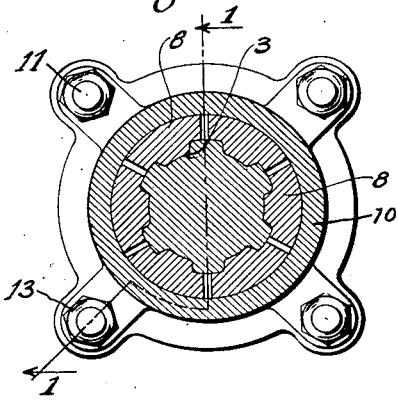
INVENTOR
FRANK G ALBORN
BY *Kiwis, Hudson & Kent.*
ATTORNEYS Patented Feb. 3, 1931

1,790,737

UNITED STATES PATENT OFFICE

FRANK G. ALBORN, OF CLEVELAND, OHIO, ASSIGNOR TO THE WHITE MOTOR COMPANY, OF CLEVELAND, OHIO, A CORPORATION OF OHIO

WHEEL AND PULLEY ATTACHING CONSTRUCTION

Application filed August 28, 1926. Serial No. 132,174.

This invention relates to a construction by which a wheel or pulley or similar device may be fastened upon the end of a shaft.

The construction, herein disclosed, is particularly intended for securing a vehicle wheel upon the end of an axle of a motor vehicle.

The object of the invention is to provide an attachment between the wheel and the axle which will securely hold the hub of the wheel in definite position upon the axle and in addition provide a friction holding means which will doubly and positively secure the wheel and axle together.

A further object of the invention is to provide a fastening means which is readily accessible at the end of the shaft so that when occasion demands the demounting of the wheel with respect to the axle, same may be rapidly and easily accomplished.

Reference should be had to the accompanying drawings forming a part of this specification, in which Fig. 1 is an elevation with portions in section of an axle, wheel, hub, the attaching means and a portion of the wheel taken on line 1—1 of Fig. 2.

Fig. 2 is a section upon the line 2—2 of Fig. 1.

Referring to the drawings, 1 indicates an axle, a portion of which is provided with a tapered surface as indicated at 2 and that portion of the axle adjacent the tapered portion 2 is provided with a plurality of elongated grooves or key-ways which are indicated at 3 in Fig. 2. The end of the axle has a threaded extension 4 adapted to receive a nut 5.

The wheel proper forms no part of the present invention consequently its structure will not be described in detail. It is sufficient to say that the wheel is provided with a hub 6 which is hollow and is adapted to be inserted on the end of the axle 1.

A portion of the inner surface of the hub is tapered such as indicated at 7, which taper is complementary to the tapered portion 2 of the axle so that when the hub is mounted upon the axle, the same will fit upon the tapered portion 2 with a wedging action.

The hub is provided with a plurality of forwardly extending fingers 8, these fingers being slightly spread and due to the adherence and springiness in the metal itself are capable of being slightly flexed. These fingers are provided with portions which are adapted to seat in the grooves 3 formed in the axle 1 and these portions are so formed that the fingers will engage at the sides and bottom of the grooves 3 when the fingers 8 are compressed, as will later be described.

When the hub is mounted upon the axle, as shown in Fig. 1, the nut 5 will bear against the ends of the fingers 8. In the drawing a loose washer 9 is shown, which is interposed between the nut 5 and the ends of the fingers 8. Turning the nut 5 will push the hub of the wheel upon the tapered portion 2 of the axle, thus providing a wedging hold between the axle and the hub. This serves to definitely position the hub and the wheel with respect to the axle and to enable take-up for wear which may occur between the parts.

It will, of course, be apparent that the frictional engagement between the hub of the wheel and the tapered portion of the axle also serves in a measure to form an attachment between the hub and the axle. However, this is not the main driving attachment, for such attachment is obtained by virtue of the engagement of the fingers 8 in the grooves 3 of the axle.

It will be noted, that the fingers 8 are provided with a relatively long tapering surface and co-operating with the tapered surface of the fingers is a collar 10, which upon its inner surface is tapered in a manner complementary with the tapered surface of the fingers 8. This collar 10 is secured to the hub of the wheel by means of studs 11 upon each of which a nut 13 is threaded, so that as the nuts are tightened, they will draw the collar 10 inwardly toward the hub of the wheel and in so doing will compress the fingers 8 into the grooves 3, causing a binding action between the fingers and the sides and bottom surface of the grooves.

This construction provides a substantially rigid driving connection between the axle and the hub of the wheel and also forms what may be termed a frictional attachment between the hub and the axle all of which is in addition to the attachment secured by the wedging fit and connection between the hub and the tapered portion 2 of the axle.

In order to encase the nut 5, a hub cap 12 is provided which is adapted to be threaded or otherwise secured upon the collar 10.

The structure which has been described is particularly useful in connection with the mounting of the vehicle wheel wherein accessibility of the means which connects the wheel to the axle is of great importance, for reasons which will be obvious.

The described construction enables the mounting or dismounting of the wheels with respect to the axle by operating entirely from the front of the wheel.

Having thus described my invention, I claim:

1. The combination with a shaft having a conically tapered portion and a longitudinal recess, of a rotatable member provided with a hub, which hub has an internal tapered portion adapted to engage with the tapered portion of the shaft, said hub being provided with an extending finger adapted to engage with said recess, and means co-operating with said finger to force the same into said recess.

2. The combination with a shaft having a conically tapered portion and longitudinal grooves with bevelled sides, of a rotatable member provided with a hub having a tapered portion adapted to engage with the tapered portion of the shaft, said hub being provided with a plurality of flexible fingers having bevelled edges adapted to engage in the said grooves of the shaft, and means adjustably attached to the hub, and co-operating with said flexible fingers to force the same into said grooves whereby the bevelled edges of the fingers are brought into driving engagement with the bevelled sides of said longitudinal grooves.

3. The combination of a shaft having a conically tapered portion, and provided with a longitudinal groove, of a rotatable member provided with a hub having an internal tapered portion adapted to engage with the tapered portion of the shaft, means for forcing the tapered portions of the hub and shaft into engagement, said hub being provided with an extended finger adapted to engage with said groove and means co-operating with said finger to force the same into said groove.

4. The combination with a shaft having a tapered portion and formed with a plurality of longitudinal recesses having bevelled edges, of a rotatable member provided with a hub having an internal tapered portion adapted to engage with the tapered portion of the shaft, means co-operating with the shaft and hub for forcing the tapered portions of the hub and shaft into engagement, said hub also being provided with a plurality of extending flexible fingers having bevelled edges adapted to engage in the said recesses, and means carried by the hub for co-operating with said fingers to force the same into the recesses whereby the bevelled edges of the fingers of said hub are forced into wedging engagement with the bevelled edges of said recess.

5. The combination with a shaft having a tapered portion and a portion provided with a plurality of longitudinal recesses therein, of a rotatable member provided with a hub having an internal tapered portion adapted to engage with the tapered portion of the shaft, threaded means on the shaft for forcing the tapered portions of the hub and shaft into engagement, said hub being provided with a plurality of extending fingers adapted to engage with said recesses, a collar co-operating with said fingers, means for securing the collar to the hub and interengaging means upon the collar and fingers whereby the collar will force the fingers into the said recesses.

6. The combination with a shaft having a plurality of longitudinal grooves with bevelled sides, a rotatable member having a hub portion mounted on said shaft, said hub portion being provided with extending flexible fingers, said fingers having a tapered peripheral portion and a longitudinal projection with bevelled edges formed on the inner periphery of each finger, a collar adjustably attached to said hub portion and having a taper adapted to engage the tapered peripheral portion of said fingers whereby the bevelled edges of said longitudinal projections are forced into wedging engagement with the bevelled sides of said longitudinal grooves.

7. The combination with a shaft having a conically tapered portion and another portion provided with a longitudinal recess, of a rotatable member provided with a hub, which hub has an internal tapered portion adapted to engage with the tapered portion of the shaft, said hub being provided with an extending finger adapted to engage with said recess, and means cooperating with said finger to force the same into said recess.

8. The combination with a shaft having a conically tapered portion and a longitudinal recess, of a rotatable member provided with a hub, which hub has an internal tapered portion adapted to engage with the tapered portion of the shaft, said hub having a finger projecting therefrom longitudinally of the shaft and adapted to engage with said recess, and means cooperating with said finger to force the same into said recess.

9. The combination with a shaft having a conically tapered portion and a longitudinal recess, of a rotatable member provided with a hub, which hub has an internal tapered portion adapted to engage with the tapered portion of the shaft, said hub having an axial portion slotted radially to form a finger adapted to engage with said recess, and means cooperating with said finger to force the same into said recess.

10. The combination with a shaft having a conically tapered portion and a longitudinal recess, of a rotatable member provided with a hub, which hub has an internal tapered portion adapted to engage with the tapered portion of the shaft, said hub being provided with an extending finger adapted to engage with said recess, and means independent of said tapered portion and cooperating with said finger to force the same into said recess.

In testimony whereof, I hereunto affix my signature.

FRANK G. ALBORN.